US011508501B2

(12) United States Patent
Kwon et al.

(10) Patent No.: US 11,508,501 B2
(45) Date of Patent: Nov. 22, 2022

(54) GRAIN-ORIENTED ELECTRICAL STEEL SHEET AND METHOD FOR MANUFACTURING GRAIN-ORIENTED ELECTRICAL STEEL SHEET

(71) Applicant: POSCO, Pohang-si (KR)

(72) Inventors: Min Serk Kwon, Pohang-si (KR); Heon Jo Choi, Pohang-si (KR); Taeyoung No, Pohang-si (KR); Byung Deug Hong, Pohang-si (KR)

(73) Assignee: POSCO, Pohang-si (KR)

( * ) Notice: Subject to any disclaimer, the term of this patent is extended or adjusted under 35 U.S.C. 154(b) by 1189 days.

(21) Appl. No.: 16/065,532

(22) PCT Filed: Dec. 22, 2016

(86) PCT No.: PCT/KR2016/015114
§ 371 (c)(1),
(2) Date: Jun. 25, 2018

(87) PCT Pub. No.: WO2017/111505
PCT Pub. Date: Jun. 29, 2017

(65) Prior Publication Data

US 2021/0202143 A1 Jul. 1, 2021

(30) Foreign Application Priority Data

Dec. 22, 2015 (KR) ........................ 10-2015-0183790

(51) Int. Cl.
*B32B 3/00* (2006.01)
*H01F 1/147* (2006.01)
(Continued)

(52) U.S. Cl.
CPC ............. *H01F 1/147* (2013.01); *C21D 6/005* (2013.01); *C21D 6/008* (2013.01); *C21D 8/005* (2013.01);
(Continued)

(58) Field of Classification Search
CPC ........ C21D 6/005; C21D 6/008; C21D 8/005; C21D 8/02; C21D 8/12; C21D 8/1222;
(Continued)

(56) References Cited

U.S. PATENT DOCUMENTS

| | | | |
|---|---|---|---|
| 5,411,808 | A | 5/1995 | Kanai et al. |
| 5,679,177 | A | 10/1997 | Kanai et al. |

(Continued)

FOREIGN PATENT DOCUMENTS

| | | | |
|---|---|---|---|
| CN | 1464914 | A | 12/2003 |
| JP | S61-246376 | A | 11/1986 |

(Continued)

OTHER PUBLICATIONS

Horiba, "Size Analysis of Colloidal Silica" 2022, Horiba (Year: 2022).*

(Continued)

*Primary Examiner* — Seth Dumbris
(74) *Attorney, Agent, or Firm* — Morgan, Lewis & Bockius LLP

(57) ABSTRACT

Provided is an oriented electrical steel sheet including: a forsterite film formed on one side or both sides of an oriented electrical steel sheet substrate; and a ceramic layer formed on an entire or partial region of the forsterite film. Provided is a manufacturing method for an oriented electrical steel sheet including: preparing an oriented electrical steel sheet having a forsterite film formed on one surface or both surfaces thereof; and forming a ceramic layer by spraying ceramic powder on the forsterite film.

13 Claims, 3 Drawing Sheets

(51) Int. Cl.

| | |
|---|---|
| ***C23C 4/134*** | (2016.01) |
| ***C21D 6/00*** | (2006.01) |
| ***C21D 8/00*** | (2006.01) |
| ***C21D 8/12*** | (2006.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C23C 4/10*** | (2016.01) |

(52) U.S. Cl.

CPC ......... *C21D 8/1222* (2013.01); *C21D 8/1233* (2013.01); *C21D 9/46* (2013.01); *C22C 38/008* (2013.01); *C22C 38/02* (2013.01); *C22C 38/04* (2013.01); *C22C 38/06* (2013.01); *C23C 4/10* (2013.01); *C23C 4/134* (2016.01); *C22C 2202/02* (2013.01); *Y10T 428/24917* (2015.01)

(58) Field of Classification Search

CPC .. C21D 8/1233; C21D 8/1277; C21D 8/1283; C21D 8/1288; C21D 9/46; C22C 38/00; C22C 38/008; C22C 38/02; C22C 38/04; C22C 38/06; C22C 2202/02; C23C 4/02; C23C 4/10; C23C 4/134; C23C 24/04; C23C 28/04; C23C 28/042; H01F 1/147; H01F 1/14783; Y10T 428/24917; Y10T 428/24926; Y10T 428/252; B32B 15/18; B32B 2250/03; B32B 2250/04

USPC .......... 148/320; 420/117; 428/209, 210, 325

See application file for complete search history.

(56) References Cited

U.S. PATENT DOCUMENTS

| | | | | |
|---|---|---|---|---|
| 5,753,051 | A | 5/1998 | Kanai et al. | |
| 5,853,499 | A | 12/1998 | Komatsubara et al. | |
| 2003/0180554 | A1 | 9/2003 | Inokuti | |
| 2013/0098507 | A1 | 4/2013 | Omura et al. | |
| 2013/0098508 | A1 | 4/2013 | Yamaguchi et al. | |
| 2015/0010762 | A1 | 1/2015 | Yamaguchi et al. | |
| 2017/0182591 | A1 * | 6/2017 | Arai et al. | B23K 26/08 |

FOREIGN PATENT DOCUMENTS

| | | | | |
|---|---|---|---|---|
| JP | H02-243754 A | 9/1990 | | |
| JP | H03-047974 A | 2/1991 | | |
| JP | H03-294469 A | 12/1991 | | |
| JP | H05-222489 A | 8/1993 | | |
| JP | H06-065755 A | 3/1994 | | |
| JP | H-0665755 A | * | 3/1994 | C21D 8/12 |
| JP | H08-269554 A | 10/1996 | | |
| JP | H08-283956 A | 10/1996 | | |
| JP | H08-319514 A | 12/1996 | | |
| JP | H09-041153 A | 2/1997 | | |
| JP | H10-183313 A | 7/1998 | | |
| JP | H10-245667 A | 9/1998 | | |
| JP | H11-302859 A | 11/1999 | | |
| JP | 3324633 B2 | 7/2002 | | |
| JP | 2006-265685 A | 10/2006 | | |
| JP | 2007-154269 A | 6/2007 | | |
| JP | 2007-177260 A | 7/2007 | | |
| JP | 2015-086426 A | 5/2015 | | |
| KR | 10-2011-0075373 A | 7/2011 | | |
| KR | 10-2014-0084892 A | 7/2014 | | |
| KR | 10-1509639 B1 | 4/2015 | | |

OTHER PUBLICATIONS

Millipore Sigma, “Silicon Carbide” 2022, Millipore Sigma (Year: 2022).*

D.H. Song et al., “Machine Translation of KR 2011-0075373” filed: 2011; translated: 2022 via Espacenet (Year: 2022).*

Y. Iida et al., “Machine Translation of JPS-61246374” filed: 1986; translated: 2022 via JPO (Year: 2022).*

Malaysian Office Action dated Jul. 7, 2021, issued in corresponding Malaysian Patent Application No. PI2018001039.

European Search Report dated Aug. 21, 2018 issued in European Patent Application No. 16879372.7.

Chinese Office Action dated Oct. 21, 2019 issued in Chinese Patent Application No. 201680075176.0.

Japanese Office Action dated Jul. 30, 2019 issued in Japanese Patent Application No. 2018-533182.

International Search Report issued in Application No. PCT/KR2016/015114 dated Mar. 22, 2017, with English translation.

* cited by examiner

GRAIN-ORIENTED ELECTRICAL STEEL SHEET AND METHOD FOR MANUFACTURING GRAIN-ORIENTED ELECTRICAL STEEL SHEET

RELATED APPLICATIONS

This application is a national stage of International Application No. PCT/KR2016/015114, filed Dec. 22, 2016, which claims the benefit of Korean Application No. 10-2015-0183790, filed on Dec. 22, 2015, the disclosures of which are incorporated in their entirety by reference herein.

TECHNICAL FIELD

The present invention relates to an oriented electrical steel sheet and a manufacturing method for an oriented electrical steel sheet.

BACKGROUND ART

In general, an oriented electrical steel sheet refers to an electrical steel sheet which includes a Si component of about 3.1% and has a texture in which grains are arranged in a direction of {110}<001> to have a very excellent magnetic characteristic in a rolling direction.

Such a {110}<001> texture can be obtained in combination of various manufacturing processes, and particularly, a series of processes of heating, hot rolling, hot-rolled sheet annealing, primary recrystallization annealing, and final annealing the texture including a component of steel slab, which should be very rigidity controlled.

Particularly, since the oriented electrical steel sheet has an excellent magnetic characteristic by a secondary recrystallized structure by inhibiting the growth of the primary recrystallized grains and selectively growing grains having an orientation of {110}<001> among the growth-inhibited grains, a growth inhibitor of the primary recrystallized grains is more important. In the final annealing process, it is one of the major issues in the oriented electrical steel sheet manufacturing technology to stably grow grains having a texture in the direction of {110}<001> among the grains whose growth is suppressed.

MnS, AIN, MnSe, and the like are growth inhibitors of the primary grains that can satisfy the above-mentioned conditions and are widely used industrially at present. Specifically, MnS, AIN, MnSe, and the like included in steel slabs are reheated at a high temperature for a long time to be solidified and then hot-rolled, and the above components having appropriate sizes and distributions in the subsequent cooling process are made to precipitates, which may be used as the growth inhibitors. However, this has a problem that the steel slab must be heated to the high temperature.

In this regard, efforts have recently been made to improve magnetic properties of the oriented electrical steel sheet by heating the steel slab at a low temperature. To this end, a method of adding antimony (Sb) element to the oriented electrical steel sheet has been proposed, but it has been pointed out that the grain size is uneven and coarse after the final high temperature annealing and the noise quality of a transformer deteriorates.

Meanwhile, in order to minimize power loss of the oriented electrical steel sheet, it is common to form an insulating film on the surface thereof and in this case, the insulating film needs to basically have a high electrical insulating property and needs to be excellent in adhesion to a material, and needs to have a uniform color. In addition, due to recent intensification of international standards for transformer noise and intensifying competition in the related industry, a research on a magnetostrictive phenomenon is required to reduce the noise of the insulating film of the oriented electrical steel sheet.

Specifically, when a magnetic field is applied to an electrical steel sheet used as an iron core of the transformer, the shrinkage and expansion are repeated to cause a trembling phenomenon, which causes vibration and noise in the transformer.

In generally known oriented electrical steel sheets, the insulating film is formed on a steel sheet and a forsterite type base film and tensile stress is applied to the steel sheet using a difference in thermal expansion coefficient of the insulating film to promote a noise reduction effect caused due to magnetic deformation, but there is a limit to satisfy a noise level in an advanced oriented electrical steel sheet which has been recently required.

Meanwhile, a wet coating method is known as a method of reducing a 90° magnetic domain of the oriented electrical steel sheet, Herein, the 90° magnetic domain refers to a region having magnetization oriented at a right angle to a magnetic field application direction and the smaller the amount of the 90° magnetic domain, the smaller the magnetostriction. However, in the general wet coating method, there is a problem that the effect of improving the noise by tensile stress is insufficient and a coating thickness must be coated with a thick film, which causes a drawback that the transformer drop ratio and efficiency become poor.

Besides, a coating method through vacuum vapor deposition such as physical Vapor deposition (PVD) and chemical vapor deposition (CVD) is known as a method of imparting high tension characteristics to the surface of the oriented electrical steel sheet. However, in such a coating method, commercial production is difficult and the oriented electrical steel sheet produced by the method has a problem in that an insulating characteristic deteriorates.

DISCLOSURE

Technical Problem

The present invention has been made in an effort to provide an oriented electrical steel sheet and a manufacturing method for an oriented electrical steel sheet having a ceramic layer formed on a forsterite film.

Technical Solution

An exemplary embodiment of the present invention provides an oriented electrical steel sheet including: a forsterite film formed on one side or both sides of an oriented electrical steel sheet substrate; and a ceramic layer formed on an entire or partial region of the forsterite film.

The ceramic layer may be formed on the partial region of the forsterite film, and portions where the ceramic layer is formed and portions where the ceramic layer is not formed may be alternately repeated many times in a width direction of the oriented electrical steel sheet to form a pattern.

A width of the portion where the ceramic layer is formed may be 2 mm or more.

A thickness of the ceramic layer may be 0.1 to 4 μm. The ceramic layer may satisfy the following Equation 1.

$$1.00 \leq A/B \leq 200 \qquad \text{[E1]}$$

(However, in Equation 1, A represents a film tension (MPa) of the ceramic layer and B represents a thickness (μm) of the ceramic layer.)

An area ratio C of the portion where the ceramic layer may be formed with respect to the entire surface of the oriented electrical steel sheet is 15 to 100%.

The ceramic layer may satisfy the following Equation 2.

$$0.01 \leq (A/B)/C \leq 10 \quad \text{[Equation 2]}$$

(However, in Equation 2, A represents a film tension (MPa) of the ceramic layer, B represents a thickness (μm) of the ceramic layer, and C represents an area ratio (%) of the portion where the ceramic layer is formed with respect to the entire surface of the oriented electrical steel sheet.)

The ceramic layer may be made of ceramic powder.

The ceramic powder may be oxide, nitride, carbide, or oxynitride including at least one kind of component selected from Li, B, Ca, Sr, Mg, Al, Si, P, Ti, V, Mn, Fe, Co, Ni, Cu, Zn, Zr, Sn and Ba.

The ceramic powder may include at least one kind selected from $Al_2O_3$, $SiO_2$, $TiO_2$, $ZrO_2$, $MgO.Al_2O_3$, $2MgO.SiO_2$, $MgO.SiO_2$, $2MgO.TiO_2$, $MgO.TiO_2$, $MgO.2TiO_2$, $Al_2O_3.SiO_2$, $3Al_2O_3.2SiO_2$, $Al_2O_3.TiO_2$, $ZnO.SiO_2$, $ZrO_2.SiO_2$, $ZrO_2.TiO_2$, $9Al_2O_3.2B_2O_3$, $2Al_2O_3.B_2O_3$, $2MgO.2Al_2O_3.5SiO_2$, $Li_2O$. $Al_2O_3.SiO_2$, $Li_2O.Al_2O_3.4SiO_2$, $BaO.Al_2O_3.SiO_2$, AlN, SiC, TiC, TiN, BN, ZrN, CrN, $BaTiO_3$, $SrTiO_3$, $FeTiO_3$, $MgTiO_3$, CaO, $FeAl_2O_4$, $CaTiO_3$, $MgAl_2O_4$, $FeTiO_4$, $SrZrO_3$, $Y_2O_3$ and $ZrSiO_4$.

A particle size of the ceramic powder may be 10 to 1000 nm,

The oriented electrical steel sheet may further include an insulating film layer including metal phosphate formed on the ceramic layer.

The metal phosphate may include at least one kind selected from Mg, Ca, Ba, Sr, Zn, Al and Mn.

The oriented electrical steel sheet substrate may include 2.6 to 5.5 wt % of silicon (Si), 0.020 to 0.040 wt % of aluminum (Al), 0.01 to 0.20 wt % of manganese (Mn), and 0.01 to 0.15 wt % of antimony (Sb), tin (Sn), or combinations thereof, and a remaining amount consisting of Fe and other unavoidable impurities.

A grain size in the oriented electrical steel sheet substrate may be 10 to 60 mm.

Another exemplary embodiment of the present invention provides a manufacturing method for an oriented electrical steel sheet including: preparing an oriented electrical steel sheet having a forsterite film formed on one surface or both surfaces thereof; and forming a ceramic layer by spraying ceramic powder on the forsterite film.

In the forming of the ceramic layer by spraying the ceramic powder on the forsterite film, the ceramic layer may be formed by spraying the ceramic powder on a partial region of the forsterite film, and the ceramic powder may be sprayed by repeating alternately portions where the ceramic layer is formed and portions where the ceramic layer is not formed many times in a width direction of the oriented electrical steel sheet to form a pattern.

In the forming of the ceramic layer by spraying the ceramic powder on the forsterite film, the ceramic powder may be sprayed so that a width of the portion where the ceramic layer is formed is 2 mm or more.

In the forming of the ceramic layer by spraying the ceramic powder on the forsterite film, the ceramic powder may be sprayed so that a thickness of ceramic layer is 0.1 to 4 μm.

The ceramic layer may satisfy the following Equation 1.

$$1.00 \leq A/B \leq 200 \quad \text{[Equation 1]}$$

(However, in Equation 2, A represents a film tension (MPa) of the ceramic layer and B represents a thickness (μm) of the ceramic layer.)

In the forming of the ceramic layer by spraying the ceramic powder on the forsterite film, an area ratio C of the portion where the ceramic layer is formed with respect to the entire surface of the oriented electrical steel sheet may be 15 to 100%.

The ceramic layer may satisfy the following Equation 2.

$$0.01 \leq (A/B)/C \leq 10 \quad \text{[Equation 2]}$$

(However, in Equation 2, A represents a film tension (MPa) of the ceramic layer, B represents a thickness (μm) of the ceramic layer, and C represents an area ratio (%) of the portion where the ceramic layer is formed with respect to the entire surface of the oriented electrical steel sheet.) In the forming of the ceramic layer by spraying the ceramic powder on the forsterite film, the ceramic layer may be formed by supplying the ceramic powder to a heat source obtained by plasmalizing gas including Ar, $H_2$, $N_2$, or He at an output of 20 to 300 kW.

The ceramic layer may be formed by supplying a mixture of the ceramic powder and a solvent to the heat source.

The ceramic powder may be oxide, nitride, carbide, or oxynitride including at least one kind of component selected from Li, B, Ca, Sr, Mg, Al, P, Ti, V, Mn, Fe, Co, Ni, Cu, Zn, Zr, Sn and Ba.

The ceramic powder may include at least one kind selected from $Al_2O_3$, $SiO_2$, $TiO_2$, $ZrO_2$, $MgO.Al_2O_3$, $2MgO.SiO_2$, $MgO.SiO_2$, $2MgO.TiO_2$, $MgO.TiO_2$, $MgO.2TiO_2$, $Al_2O_3.SiO_2$, $3Al_2O_3.2SiO_2$, $Al_2O_3.TiO_2$, $ZnO.SiO_2$, $ZrO_2.SiO_2$, $ZrO_2.TiO_2$, $9Al_2O_3.2B_2O_3$, $2Al_2O_3.B_2O_3$, $2MgO.2Al_2O_3.5SiO_2$, $Li_2O.Al_2O_3.SiO_2$, $Li_2O.Al_2O_3.4SiO_2$, $BaO.Al_2O_3.SiO_2$, AlN, SIC, TIC, TIN, BN, ZrN, CrN, $BaTiO_3$, $SrTiO_3$, $FeTiO_3$, $MgTiO_3$, CaO, $FeAl_2O_4$, $CaTiO_3$, $MgAl_2O_4$, $FeTiO_4$, $SrZrO_3$, $Y_2O_3$ and $ZrSiO_4$.

A particle size of the ceramic powder may be 10 to 1000 nm.

The manufacturing method may further include forming an insulating film layer by applying and drying an insulting film composition including metal phosphate, after the forming of the ceramic layer by spraying the ceramic powder on the forsterite film.

The metal phosphate may include at least one kind selected from Mg, Ca, Ba, Sr, Zn, Al and Mn.

The metal phosphate may be obtained by a reaction of metal hydroxide and phosphoric acid.

The preparing of the oriented electrical steel sheet having the forsterite film formed on one surface or both surface thereof may include preparing a slab including 2.6 to 5.5 wt % of silicon (Si), 0.020 to 0.040 wt %, of aluminum (Al), 0.01 to 0.20 wt % of manganese (Mn), and 0.01 to 0.15 wt % of antimony (Sb), tin (Sn), or combinations thereof, and a remaining amount consisting of Fe and other unavoidable impurities; manufacturing a hot-rolled sheet by heating and hot-rolling the slab; manufacturing a cold-rolled sheet by cold-rolling the hot-rolled sheet; obtaining a decarburized and annealed steel sheet by decarburizing and annealing the cold-rolled sheet; and applying an annealing separator to the decarburized and annealed steel sheet and finally annealing the applied steel sheet.

In the obtaining of the decarburized and annealed steel sheet by decarburizing and annealing the cold-rolled sheet, the cold-rolled sheet may be decarburized and simultaneously nitrided or nitrided after decarburizing and annealed to obtain the decarburized and annealed steel sheet.

Advantageous Effects

According to the exemplary embodiment of the present invention, it is possible to an oriented electrical steel sheet and a manufacturing method therefor having an excellent iron loss.

MODE FOR INVENTION

Figure 1:
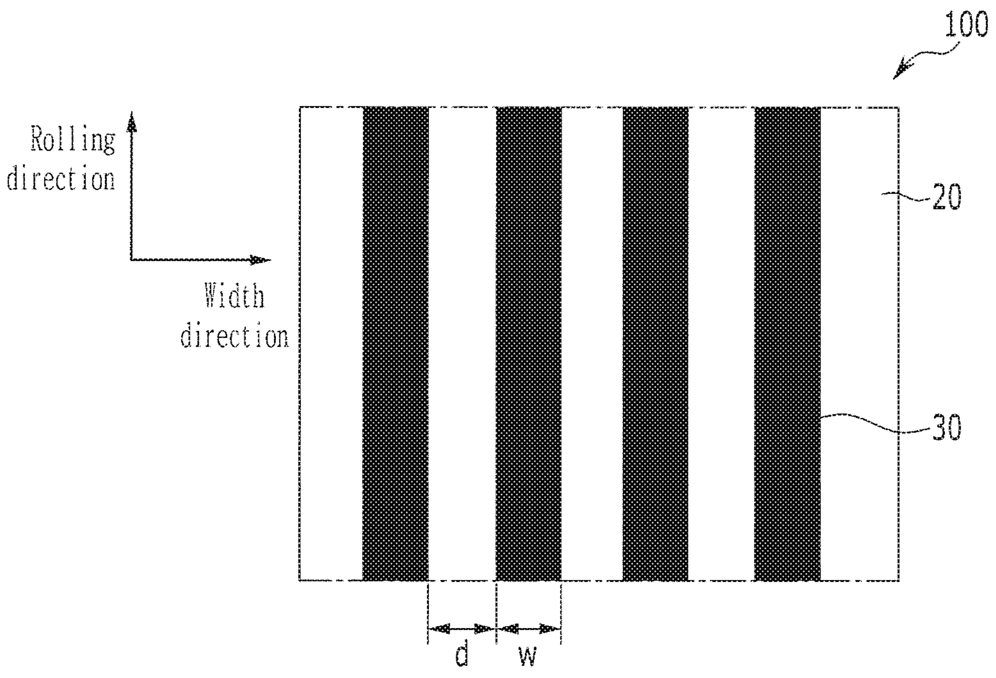
FIG. 1 is a schematic top view of an electrical steel sheet according to an exemplary embodiment of the present invention.

Terms such as first, second, and third are used to illustrate various portions, components, regions, layers and/or sections, but not limit them. These terms are used to discriminate the portions, components, regions, layers or sections from the other portions, components, regions, layers or sections. Therefore, the first portion, component, region, layer or section to be described below may be described as the second portion, component, region, layer or section without departing from the scope of the present invention.

It is to be understood that the terminology used therein is for the purpose of describing particular embodiments only and is not intended to be limiting. Singular forms used therein include plural forms unless the context clearly dictates otherwise.

It will be further understood that the terms "comprises" used in this specification, specify the presence of stated properties, regions, integers, steps, operations, elements, and/or components, but do not preclude the presence or addition of one or more other properties, regions, integers, steps, operations, elements, and/or components thereof.

It will be understood that when an element is referred to as being "over" or "on" another element, it can be directly over or on the other element or intervening elements may also be present. In contrast, when it is described that a certain part is located "directly above" another part, it means that there is no third part therebetween.

All terminologies that include technical terminologies and scientific terminologies used herein have the same meaning as that understood by those who are skilled in the art to which the present invention belongs. The terminologies that are defined previously are further understood to have the meaning that coincides with the contents that are disclosed in relating technical documents, but not as the ideal or very official meaning unless it is not defined.

The present invention will be described more fully hereinafter with reference to the accompanying drawings, in which exemplary embodiments of the invention are illustrated. As those skilled in the art would realize, the described embodiments may be modified in various different ways, all without departing from the spirit or scope of the present invention.

An oriented electrical steel sheet 100 according to an exemplary embodiment of the present invention includes a forsterite ($Mg_2SiO_4$) film 20 formed on one side or both sides of an oriented electrical steel sheet substrate 10 and a ceramic layer 30 formed on an entire or partial region of the forsterite film 20.

The reasons for limiting the components of the oriented electrical steel sheet substrate 10 will be described below.

Si: 2.6 to 5.5 wt %

Silicon (Si) increases the resistivity of the steel to reduce iron loss. When the content of Si is too small, the resistivity of the steel becomes small and the iron loss characteristic deteriorates. In high temperature annealing, a phase transformation period is present and thus there is a problem in that secondary recrystallization becomes unstable. If the content of Si is too large, the brittleness increases and cold rolling may become difficult. Therefore, the content of Si may be controlled within the above-mentioned range. More specifically, Si may be included in an amount of 2.6 to 4.3 wt %.

Al: 0.020 to 0.040 wt %

Aluminum (Al) is a component that is finally made of a nitride of AlN, (Al, Si) N, or (Al, Si, Mn) N type a component to act as an inhibitor. When the content of Al is too small, it is difficult to expect a sufficient effect as an inhibitor. Further, when the content of Al is too large, the Al-based nitride is very coarsely precipitated or grown, so that the effect as an inhibitor may become insufficient. Therefore, the content of Al may be controlled within the above-mentioned range.

Mn: 0.01 to 0.20 wt %

Mn has an effect of reducing the iron loss by increasing the resistivity like Si and is an important element which reacts with nitrogen introduced by the nitriding treatment together with Si to form precipitates of (Al,Si,Mn)N, thereby causing secondary recrystallization by inhibiting the growth of the primary recrystallized grains. However, when the content of Mn is too large, since the austenite phase transformation is promoted during hot rolling, the size of the primary recrystallized grains is decreased to make the secondary recrystallization unstable. When the content of Mn is too small, as an austenite forming element, a high capacity of precipitates is increased by increasing an austenite fraction at the time of hot rolling reheating, and thus, an effect of preventing the primary recrystallized grains from being enlarged through the refinement of the precipitates and formation of MnS at the time of reprecipitating may insufficiently occur. Therefore, the content of Mn may be controlled within the above-mentioned range.

Sb, Sn or combination thereof: 0.01 to 0.15 wt %

Since Sb or Sn is an element which interferes the movement of a grain boundary as a grain boundary segregation element, Sb or Sn is an important element in control of a grain size by promoting generation of goss grains in {110}<001> orientation so that secondary recrystallization is well developed. If the content of Sb or Sn added alone or in combination is too small, the effect may be deteriorated. If the content of Sb or Sn added alone or in combination is too large, the grain boundary segregation occurs severely and the brittleness of the steel sheet becomes large, resulting in plate breakage during rolling.

Since the noise of the oriented electrical steel sheet is caused by the vibration caused by the magnetostriction, in order to improve a noise characteristic, there is a method of reducing a 90° magnetic domain by refining the high temperature annealing grain size on the steel sheet. However, in a general manufacturing method for an oriented electrical steel sheet, the grain is size is large and non-uniform, and the noise improving effect is insufficient.

The oriented electrical steel sheet substrate 10 according to the exemplary embodiment of the present invention has an excellent effect of improving transformer noise by adding Sb or Sn alone or in combination to control the high temperature annealing grain size to a range of 10 to 60 mm. If the grain size is too small, a magnetic flux density is deteriorated, so that it is not enough to produce a product such as a transformer. In addition, if the grain size is too large, the magnetostriction becomes severe and it is difficult to manufacture a low-noise transformer. At this time, the grain size means a circle equivalent diameter measured by an intercept method.

The forsterite film 20 is formed by reacting magnesium oxide (MgO), which is a main component of a coating agent, with silicon (Si) included in the oriented electrical steel sheet in decarburizing and nitridation annealing and then applying an annealing separator to prevent sticking between materials during high-temperature annealing for forming secondary recrystallization in the manufacturing process of the oriented electrical steel sheet. Such a forsterite film 20 is insufficient in the effect of imparting the film tension, and thus there is a limit in reducing the iron loss of the electrical steel sheet.

In the oriented electrical steel sheet 100 according to the exemplary embodiment of the present invention, the ceramic layer 30 is formed on the forsterite film 20 to give a film tension effect and maximize the effect of improving the iron loss of the oriented electrical steel sheet, and thus, it is possible to manufacture an oriented electrical steel sheet with extremely low iron loss.

The ceramic layer 30 may be formed on an entire or partial region of the forsterite film 20. When the ceramic layer is formed on the part of the forsterite film 20, portions where the ceramic layer 30 is formed and portions where the ceramic layer is not formed are alternately repeated many times in a width direction of the oriented electrical steel sheet 100 to form a pattern. FIG. 1 illustrates a schematic top view of the oriented electrical steel sheet 100 having such a pattern. As illustrated in FIG. 1, in the width direction of the oriented electrical steel sheet, the portions where the ceramic layer 30 is formed and portions where the forsterite film 20 is exposed without forming the ceramic layer 30 are alternately repeated many times to form a pattern. In this case, a width w of the portion where the ceramic layer 30 is formed may be 2 mm or more. If the width w is too small, the effect of improving the iron loss due to the application of the tension is insignificant, and a plurality of coating nozzles need to be formed, and thus, there is a problem in a complicated process. When the ceramic layer 30 is formed on the entire region of the forsterite film 20, the width w may be infinitely increased and thus, the upper limit of the width is not limited.

A thickness of the ceramic layer 30 may be 0.1 to 4 μm. When the thickness of the ceramic layer 30 is too small, there is a problem in that an insulating effect of the ceramic layer 30 is lowered. When the thickness of the ceramic layer 30 is too large, the adhesion of the ceramic layer 30 is lowered and the peeling may occur. Accordingly, the thickness of the ceramic layer 30 may be controlled to the above-described range. More particularly, the thickness of the ceramic layer 30 may be 0.8 to 2.5 μm.

The ceramic layer 30 may satisfy the following Equation 1.

$$1.00 \leq A/B \leq 200 \quad \text{[Equation 1]}$$

(However, in Equation 1, A represents a film tension (MPa) of the ceramic layer and B represents a thickness (pm) of the ceramic layer.)

In Equation 1, if the A/B value is too low, the insulation and noise characteristics of the oriented electrical steel sheet may be deteriorated and it is may be insufficient to manufacture a product such as a transformer. When the A/B value is too high, a drop rate becomes low, and thus it is difficult to manufacture an efficient transformer. Accordingly, like Equation 1, the range of A/B may be limited. More particularly, the range of A/B may be $2.80 \leq A/B \leq 17.50$. In this case, the film tension is obtained by measuring a bending degree of the oriented electrical steel sheet 100 where the ceramic layer 30 is formed and a unit thereof is MPa.

An area ratio C of the portion where the ceramic layer 30 is formed with respect to the entire surface of the oriented electrical steel sheet 100 may be 15 to 100%. If the area ratio of the ceramic layer 30 is too small, an effect of improving the iron loss due to the tension may be insignificant. More specifically, the area ratio of the ceramic layer 30 may be 40 to 80%.

The ceramic layer 30 may satisfy the following Equation 2.

$$0.01 \leq (A/B)/C \leq 10 \quad \text{[Equation 2]}$$

(However, in Equation 2, A represents a film tension (MPa) of the ceramic layer, B represents a thickness (μm) of the ceramic layer, and C represents an area ratio (%) of the portion where the ceramic layer is formed with respect to the entire surface of the oriented electrical steel sheet.)

When the (A/B)/C value is too small, the drop rate and the noise characteristic of the oriented electrical steel sheet are deteriorated and it is difficult to manufacture an efficient transformer. When the (A/B)/C value is too large, the film adhesion is deteriorated and it is insufficient to manufacture a product such as a transformer. Accordingly, like Equation 2, the range of (A/B)/C may be limited. More specifically, the range of (A/B)/C may be $0.035 \leq (A/B)/C \leq 0.438$.

The ceramic layer 30 may be made of ceramic powder. The ceramic powder may be oxide, nitride, carbide, or oxynitride including at least one kind of component selected from Li, B, Ca, Sr, Mg, Al, Si, P. Ti, V, Mn, Fe, Co, Ni, Cu, Zn, Zr, Sn and Ba. More specifically, ceramic powder may include at least one kind selected from $Al_2O_3$, $SiO_2$, $TiO_2$, $ZrO_2$, $MgO.Al_2O_3$, $2MgO.SiO_2$, $MgO.SiO_2$, $2MgO.TiO_2$, $MgO.TiO_2$, $MgO.2TiO_2$, $Al_2O_3.SiO_2$, $3Al_2O_3.2SiO_2$, $Al_2O_3.TiO_2$, $ZnO.SiO_2$, $ZrO_2.SiO_2$, $ZrO_2.TiO_2$, $9Al_2O_3.2B_2O_3$, $2Al_2O_3.B_2O_3$, $2MgO.2Al_2O_3.5SiO_2$, $Li_2O.Al_2O_3.SiO_2$, $Li_2O.Al_2O_3.4SiO_2$, $BaO.Al_2O_3.SiO_2$, AlN, SiC, TiC, TiN. BN, ZrN, CrN, $BaTiO_3$, $SrTiO_3$, $FeTiO_3$, $MgTiO_3$, CaO, $FeAl_2O_4$, $CaTiO_3$, $MgAl_2O_4$, $FeTiO_4$, $SrZrO_3$, $Y_2O_3$ and $ZrSiO_4$.

A particle size of the ceramic powder may be 10 to 1000 nm. When the particle size of the ceramic powder is too small, it may be difficult to form the ceramic layer. When the particle size of the ceramic powder is too large, surface roughness becomes coarse and thus the surface defects may occur. Accordingly, the particle size of the ceramic powder may be controlled to the above-described range.

The ceramic powder may be in the form of at least one selected from the group including a spherical form, a plate-like form, and an acicular form.

The method of forming the ceramic layer 30 will be described in detail with reference to the manufacturing method of the oriented electrical steel sheet 100 to be described below.

Figure 2:
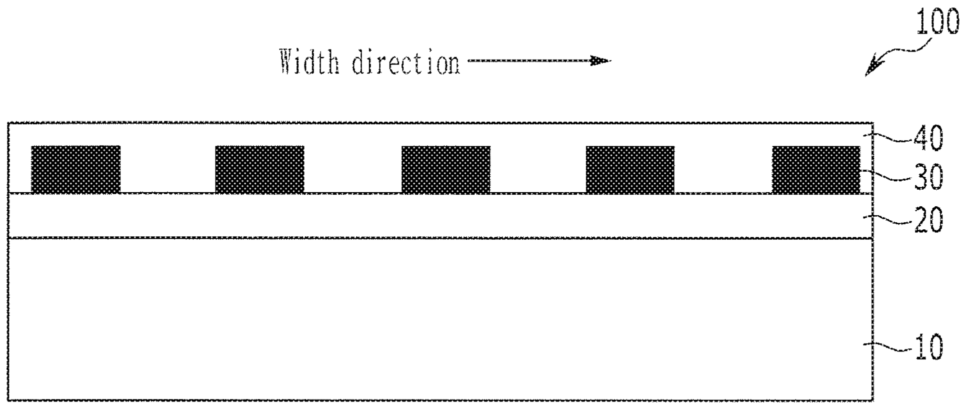
FIG. 2 is a schematic side view of the electrical steel sheet according to the exemplary embodiment of the present invention.

An insulating film layer 40 including metal phosphate may be further formed on the ceramic layer 30. The insulating film layer 40 is further formed to improve an insulation characteristic. When the ceramic layer 30 is formed on the part of the forsterite film 20, the insulating film layer 40 may be formed on the ceramic layer 30 and the forsterite film 20 where the ceramic layer is not formed. FIG. 2 illustrates a schematic side view of the oriented electrical steel sheet 100 where the insulating film layer 40 is formed when the ceramic layer 30 is formed on the part of the forsterite film 20.

The metal phosphate may include at least one kind selected from Mg, Ca, Ba, Sr, Zn, Al and Mn.

The metal phosphate may be made of a compound by a chemical reaction of metal hydroxide and phosphoric acid ($H_3PO_4$).

The metal phosphate is made of a compound by a chemical reaction of metal hydroxide and phosphoric acid ($H_3PO_4$) and the metal hydroxide may be at least one kind selected from the group including $Sr(OH)_2$, $Al(OH)_3$, $Mg(OH)_2$, $Zn(OH)_2$ and $Ca(OH)_2$.

Particularly, the metal atom of the metal hydroxide may be formed by forming a single bond, a double bond, or a triple bond by a substitution reaction with phosphorus of phosphoric acid, and may be formed of a compound in which the amount of unreacted free phosphoric acid ($H_3PO_4$) is 25% or less.

The metal phosphate is formed of a compound by the chemical reaction of the metal hydroxide and the phosphoric acid ($H_3PO_4$) and a weight ratio of the metal hydroxide to the phosphoric acid may be 1:100 to 40:100.

If the amount of the metal hydroxide is too large, the chemical reaction may not be completed and there is a problem in that the precipitates may occur.

If the amount of the metal hydroxide is too small, there is a problem in that corrosion resistance may deteriorate and thus, the above range may be limited.

Figure 3:
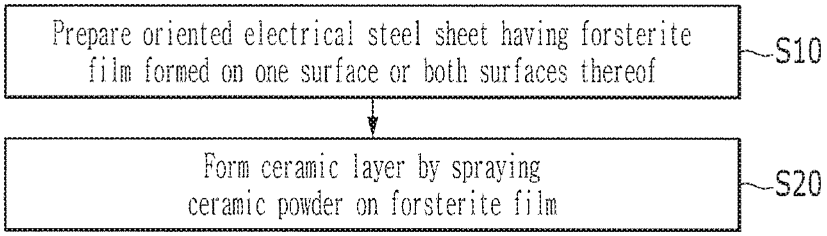
FIG. 3 is a schematic flowchart of a manufacturing method of an electrical steel sheet according to another exemplary embodiment of the present invention.

FIG. 3 schematically illustrates a flowchart of a manufacturing method for an oriented electrical steel sheet according to an exemplary embodiment of the present invention. The flowchart of the manufacturing method for the oriented electrical steel sheet of FIG. 3 is merely for exemplifying the present invention and the present invention is not limited thereto. Accordingly, the manufacturing method for the oriented electrical steel sheet may be variously modified.

As illustrated in FIG. 3, the manufacturing method for the oriented electrical steel sheet includes preparing an oriented electrical steel sheet having a forsterite film formed on one surface or both surfaces thereof (S10), and forming a ceramic layer by spraying ceramic powder on the forsterite film (S20). In addition, the manufacturing method for the oriented electrical steel sheet may further include other steps.

In step S10, the oriented electrical steel sheet having the forsterite film 20 formed on one surface or both surfaces thereof is prepared.

Specifically, step S10 includes preparing a slab including 2.6 to 5.5 wt % of silicon (Si), 0.020 to 0.040 wt % of aluminum (Al), 0.01 to 0.20 wt % of manganese (Mn), and 0.01 to 0.15 wt % of antimony (Sb), tin (Sn), or combinations thereof, and a remaining amount consisting of Fe and other unavoidable impurities; heating and hot-rolling the slab to manufacture a hot-rolled sheet: cold-rolling the hot-rolled sheet to manufacture a cold-rolled sheet; decarburizing and annealing the cold-rolled sheet to obtain a decarburized and annealed steel sheet; and applying an annealing separator to the decarburized and annealed steel sheet and finally annealing the applied steel sheet. In this case, the slab may be first heated at 1200° C. or lower before hot rolling. Further, the hot-rolled sheet manufactured after the hot rolling may be annealed. Further, nitriding may be performed after the decarburizing and annealing or simultaneously with the decarburizing and annealing. Since such a process follows a general process, description for detailed manufacturing conditions will be described.

Since the composition of the slab is the same as that of the oriented electrical steel sheet described above, the repeated description is omitted.

As such, in a series of processes of hot rolling, cold roiling, decarburizing and annealing, and final annealing the slab having the composition according to the exemplary embodiment of the present invention, a process condition may be controlled so that a grain size after the final annealing satisfies a range of 10 to 60 mm.

Next, in step S20, the ceramic layer 30 is formed by spraying the ceramic powder onto the forsterite film 20.

As the method of forming the ceramic layer 30, methods such as plasma spray, high velocity oxy fuel, aerosol deposition, and cold spray may be applied.

More specifically, the method may use a plasma spray coating method in which the ceramic powder is supplied to a heat source obtained by plasmalizing gas including Ar, $H_2$, $N_2$, or He at an output of 20 to 300 kW to form the ceramic layer.

Further, as the plasma spray coating method, a mixture of the ceramic powder and a solvent may be supplied to the heat source obtained by plasmalizing gas including Ar, $H_2$, $N_2$, or He at an output of 20 to 300 kW in a suspension form to form the ceramic layer 30. In this case, the solvent may be water or alcohol.

The ceramic powder may be oxide, nitride, carbide, or oxynitride including at least one kind of component selected from Li, B, Ca, Sr, Mg, Al, Si, P, Ti, V, Mn, Fe, Co, Ni, Cu, Zn, Zr, Sn and Ba. More specifically, the ceramic powder may include at least one kind selected from $Al_2O_3$, $SiO_2$, $TiO_2$, $ZrO_2$, $MgO.Al_2O_3$, $2MgO.SiO_2$, $MgO.SiO_2$, $2MgO.TiO_2$, $MgO.TiO_2$, $MgO.2TiO_2$, $Al_2O_3.SiO_2$, $3Al_2O_3.2SiO_2$, $Al_2O_3.TiO_2$, $ZnO.SiO_2$, $ZrO_2.SiO_2$, $ZrO_2.TiO_2$, $9Al_2O_3.2B_2O_3$, $2Al_2O_3.B_2O_3.2MgO.2Al_2O_3.5SiO_2$, $Li_2O.Al_2O_3.SiO_2$, $Li_2O.Al_2O_3.4SiO_2$, $BaO.Al_2O_3.SiO_2$, AlN, SiC, TiC, TiN, BN, ZrN, CrN, $BaTiO_3$, $SrTiO_3$, $FeTiO_3$, $MgTiO_3$, CaO, $FeAl_2O_4$, $CaTiO_3$, $MgAl_2O_4$, $FeTiO_4$, $SrZrO_3$, $Y_2O_3$ and $ZrSiO_4$.

A particle size of the ceramic powder may be 10 to 1000 nm. When the particle size of the ceramic powder is too small, it may be difficult to form the ceramic layer. When the particle size of the ceramic powder is too large, surface roughness becomes coarse and thus the surface defects may occur. Accordingly, the particle size of the ceramic powder may be controlled to the above-described range.

The ceramic powder may be in the form of at least one selected from the group including a spherical form, a plate-like form, and an acicular form.

The ceramic layer 30 may be formed on an entire or partial region of the forsterite film 20. When the ceramic layer is formed on the part of the forsterite film 20, portions where the ceramic layer 30 is formed and portions where the ceramic layer is not formed are alternately repeated many times in a width direction of the oriented electrical steel sheet 100 to form a pattern. FIG. 1 illustrates a schematic top view of the oriented electrical steel sheet 100 having such a pattern. As illustrated in FIG. 1, in the width direction of the oriented electrical steel sheet, the portions where the ceramic layer 30 is formed and portions where the forsterite film 20 is exposed without forming the ceramic layer 30 are alternately repeated many times to form a pattern. In this case, a width w of the portion where the ceramic layer 30 is formed may be 2 mm or more. If the width w is too small, the effect of improving the iron loss due to the application of the tension is insignificant, and a plurality of coating nozzles need to be formed, and thus, there is a problem in a complicated process. When the ceramic layer 30 is formed on the entire region of the forsterite film 20, the width to w may be infinitely increased and thus, the upper limit of the width is not limited.

A thickness of the ceramic layer 30 may be 0.1 to 4 μm. When the thickness of the ceramic layer 30 is too small, there is a problem in that an insulating effect of the ceramic layer 30 is lowered. When the thickness of the ceramic layer 30 is too large, the adhesion of the ceramic layer 30 is lowered is and the peeling may occur. Accordingly, the thickness of the ceramic layer 30 may be controlled to the above-described range. More particularly, the thickness of the ceramic layer 30 may be 0.8 to 2.5 μm.

The ceramic layer 30 may satisfy the following Equation 1.

$$1.00 \leq A/B \leq 200 \quad \text{[Equation 1]}$$

(However, in Equation 1, A represents a film tension (MPa) of the ceramic layer and B represents a thickness (μm) of the ceramic layer.)

In Equation 1, if the A/B value is too low, the insulation and noise characteristics of the oriented electrical steel sheet may be deteriorated and it is may be insufficient to manufacture a product such as a transformer. When the NB value is too high, a drop rate becomes low, and thus it is difficult to manufacture an efficient transformer. Accordingly, like Equation 1, the range of A/B may be limited. More particularly, the range of NB may be 2.80≤A/B≤17.50. In this case, the film tension is obtained by measuring a bending degree of the oriented electrical steel sheet 100 where the ceramic layer 30 is formed and a unit thereof is MPa.

An area ratio C of the portion where the ceramic layer 30 is formed with respect to the entire surface of the oriented electrical steel sheet 100 may be 15 to 100%. If the area ratio of the ceramic layer 30 is too small, an effect of improving the iron loss due to the tension may be insignificant. More specifically, the area ratio of the ceramic layer 30 may be 40 to 80%.

The ceramic layer 30 may satisfy the following Equation 2.

$$0.01 \leq (A/B)/C \leq 10 \quad \text{[Equation 2]}$$

(However, in Equation 2, A represents a film tension (MPa) of the ceramic layer, B represents a thickness (μm) of the ceramic layer, and C represents an area ratio (%) of the portion where the ceramic layer is formed with respect to the entire surface of the oriented electrical steel sheet.)

When the (A/B)/C value is too small, the drop rate and the noise characteristic of the oriented electrical steel sheet are deteriorated and it is difficult to manufacture an efficient transformer. When the (A/B)/C value is too large, the film adhesion is deteriorated and it is insufficient to manufacture a product such as a transformer, Accordingly, like Equation 2, the range of (A/B)/C may be limited. More specifically, the range of (A/B)/C may be 0.035≤(A/B)/C≤0.438.

After step S20, the method may further include forming the insulating film layer 40 by coating and drying an insulation coating composition including metal phosphate.

The metal phosphate may include at least one kind selected from Mg, Ca, Ba, Sr, Zn, Al and Mn.

The metal phosphate may be made of a compound by a chemical reaction of metal hydroxide and phosphoric acid ($H_3PO_4$).

The metal phosphate is made of a compound by a chemical reaction of metal hydroxide and phosphoric acid ($H_3PO_4$) and the metal hydroxide may be at least one kind selected from he group including $Sr(OH)_2$, $Al(OH)_3$, $Mg(OH)_2$, $Zn(OH)_2$ and $Ca(OH)_2$.

Particularly, the metal atom of the metal hydroxide may be formed by forming a single bond, a double bond, or a triple bond by a substitution reaction with phosphorus of phosphoric acid, and may be formed of a compound in which the amount of unreacted free phosphoric acid ($H_3PO_4$) is 25% or less.

The metal phosphate is formed of a compound by the chemical reaction of the metal hydroxide and the phosphoric acid ($H_3PO_4$) and a weight ratio of the metal hydroxide to the phosphoric acid may be 1:100 to 40:100.

If the amount of the metal hydroxide is too large, the chemical reaction may not be completed and there is a problem in that the precipitates may occur. If the amount of the metal hydroxide is too small, there is a problem in that corrosion resistance may deteriorate and thus, the above range may be limited.

The method may further include heat-treating after forming the insulating film layer 40. In this case, the heat-treating may be performed in a temperature range of 250 to 950° C. When the heat-treating temperature is too high, cracks may occur on the generated insulating film layer 40, and when the heat-treating temperature is too low, the generated insulating film is not sufficiently dried and thus there is a problem in corrosion resistance and weather resistance. Accordingly, the heat-treating temperature may be limited to the aforementioned range.

Further, the heat-treating may be performed for 30 seconds to 70 to seconds. When the heat-treating time is too long, the productivity may be deteriorated, and when the heat-treating time is too short, the corrosion resistance and the weather resistance may occur. Therefore, the heat-treating time may be limited to the aforementioned range. DeletedTexts경우에는

Hereinafter, the present invention will be described in more detail with reference to Examples. However, these Examples are only for illustrating the present invention, and the present invention is not limited thereto.

EXAMPLE 1

Characteristics for Each Type of Ceramic Powder

Inventive Example 1

A slab including 3.4 wt % of silicon (Si), 0.03 wt % of aluminum (Al), 0.10 wt % of manganese (Mn), 0.05 wt % of antimony (Sb), 0.05 wt % of tin (Sn), and a remaining amount consisting of Fe and other unavoidable impurities was prepared.

The slab was heated at 1150° C. for 220 minutes and hot-rolled to a thickness of 2.3 mm to prepare a hot-rolled sheet.

The hot-rolled sheet was heated up to 1120° C., kept at 920° C. for 95 seconds, cooled and pickled in water, and then cold-rolled with a thickness of 0.23 mm to manufacture a cold-rolled sheet.

The cold-rolled sheet was introduced into a furnace which is kept at 850° C. and then a dew point temperature and oxidizing ability were controlled, and then decarburizing nitriding and primary recrystallization annealing are simultaneously performed in a mixed gas atmosphere of hydrogen, nitrogen, and ammonia to manufacture a decarburized and annealed steel sheet.

Thereafter, slurry was prepared by mixing distilled water with an annealing separator including MgO as a main component and the slurry was applied to a decarburized annealed steel sheet using a roll or the like, and then final annealing was performed.

At the time of final annealing, a primary cracking temperature was 700° C. and a secondary cracking temperature was 1200° C., and a temperature is period of a temperature rising period was 15° C./hr. Further, up to 1200° C., a mixed gas atmosphere of 25 vol % of nitrogen and 75 vol % of hydrogen was set and after reaching 1200° C., a hydrogen gas atmosphere of 100 vol % was kept for 15 hours, and then furnace cooling was performed.

Thereafter, $Al_2O_3$ was supplied as ceramic powder to a heat source plasmalizing argon (Ar) gas at an output of 200 kW and a ceramic layer having a thickness of 1.2 μm was formed on the surface of the final annealing sheet with a coating width w of 30 mm and a coating interval d of 20 mm in rolling direction.

Inventive Examples 2 to 41

Inventive Examples 2 to 41 were performed in the same manner as Inventive Example 1, but a ceramic powder was replaced with a ceramic powder summarized in Table 1 below to form a ceramic layer.

Comparative Example 1

Comparative Example 1 was performed in the same manner as

Inventive Example 1, but the ceramic layer was not formed.

Comparative Example 2

Comparative Example 2 was performed in the same manner as Inventive Example 1, but the ceramic layer was not formed and an insulating film composition was prepared by mixing colloidal silica and aluminum phosphate in a weight ratio of 1:1 and applied to form an insulating film layer having a thickness of 1.2 μm.

Experimental Example 1

Evaluation of Magnetic Characteristic and Noise Characteristic

Under conditions of 1.7 T and 50 Hz, magnetic and noise characteristics of each oriented electrical steel sheet prepared in Example 1 were evaluated, and the results were listed in Table 1.

In a magnetic characteristic of an electrical steel sheet, $W_{17/50}$ and $B_8$ were generally used as representative values. The $W_{17/50}$ refers to a power loss exhibited when a magnetic field of a frequency of 50 Hz was magnetized with AC up to 1.7 Tesla. Herein, Tesla is a unit of magnetic flux density, which means a magnetic flux per unit area. The $B_8$ represents a magnetic flux density value flowing through the electrical steel sheet when a current amount of 800 A/m is applied to a coil wound around the electrical steel sheet.

A noise evaluation method selected in the exemplary embodiment of the present invention is evaluated in the same manner as the international standard IEC 61672-1, but vibration data of the electrical steel sheet is obtained instead of a sound pressure and evaluated as a noise conversion value [dBA]. In the vibration of the electrical steel sheet, a vibration pattern is contactlessly measured over time by using a laser Doppler method when the magnetic field having the frequency of 50 Hz is magnetized with AC up to 1.7 Tesla.

TABLE 1

| | | Magnetic characteristic | | |
|---|---|---|---|---|
| Classification | Ceramic powder | $W_{17/50}$ (W/kg) | $B_8$ (T) | Noise (dBa) |
| Inventive Example 1 | $Al_2O_3$ | 0.72 | 1.930 | 44.2 |
| Inventive Example 2 | $SiO_2$ | 0.76 | 1.925 | 45.5 |
| Inventive Example 3 | $TiO_2$ | 0.67 | 1.927 | 43.1 |
| Inventive Example 4 | $ZrO_2$ | 0.74 | 1.915 | 45.5 |
| Inventive Example 5 | $MgO•Al_2O_3$ | 0.77 | 1.909 | 44.0 |
| Inventive Example 6 | $2MgO•SiO_2$ | 0.77 | 1.934 | 41.7 |
| Inventive Example 7 | $MgO•SiO_2$ | 0.78 | 1.917 | 47.1 |
| Inventive Example 8 | $2MgO•TiO_2$ | 0.75 | 1.920 | 45.2 |
| Inventive Example 9 | $MgO•TiO_2$ | 0.75 | 1.918 | 47.1 |
| Inventive Example 10 | $MgO•2TiO_2$ | 0.76 | 1.934 | 49.4 |
| Inventive Example 11 | $Al_2O_3•SiO_2$ | 0.81 | 1.904 | 52.7 |
| Inventive Example 12 | $3Al_2O_3•2SiO_2$ | 0.82 | 1.904 | 52.4 |
| Inventive Example 13 | $Al_2O_3•TiO_2$ | 0.81 | 1.908 | 52.2 |
| Inventive Example 14 | $ZnO•SiO_2$ | 0.83 | 1.914 | 52.2 |
| Inventive Example 15 | $ZrO_2•SiO_2$ | 0.82 | 1.921 | 51.0 |
| Inventive Example 16 | $ZrO_2•TiO_2$ | 0.82 | 1.908 | 50.5 |
| Inventive Example 17 | $9Al_2O_3•2B_2O_3$ | 0.71 | 1.941 | 44 |
| Inventive Example 18 | $2Al_2O_3•B_2O_3$ | 0.73 | 1.936 | 44 |
| Inventive Example 19 | $2MgO•2Al_2O_3•5SiO_2$ | 0.75 | 1.922 | 45 |
| Inventive Example 20 | $Li_2O•Al_2O_3•2SiO_2$ | 0.77 | 1.924 | 46 |
| Inventive Example 21 | $Li_2O•Al_2O_3•4SiO_2$ | 0.77 | 1.925 | 45 |
| Inventive Example 22 | $BaO•Al_2O_3•SiO_2$ | 0.83 | 1.911 | 53 |
| Inventive Example 23 | AlN | 0.85 | 1.911 | 53 |
| Inventive Example 24 | SiC | 0.85 | 1.909 | 53 |
| Inventive Example 25 | TiC | 0.86 | 1.918 | 54 |
| Inventive Example 26 | TiN | 0.84 | 1.925 | 52 |
| Inventive Example 27 | BN | 0.84 | 1.914 | 52 |
| Inventive Example 28 | ZrN | 0.84 | 1.911 | 53 |

TABLE 1-continued

| Classification | Ceramic powder | Magnetic characteristic $W_{17/50}$ (W/kg) | $B_8$ (T) | Noise (dBa) |
|---|---|---|---|---|
| Inventive Example 29 | CrN | 0.82 | 1.910 | 53 |
| Inventive Example 30 | $BaTiO_3$ | 0.77 | 1.920 | 45 |
| Inventive Example 31 | $SrTiO_3$ | 0.78 | 1.915 | 46 |
| Inventive Example 32 | $FeTiO_3$ | 0.85 | 1.923 | 50 |
| Inventive Example 33 | $MgTiO_3$ | 0.86 | 1.908 | 52 |
| Inventive Example 34 | CaO | 0.87 | 1.900 | 54 |
| Inventive Example 35 | $FeAl_2O_4$ | 0.87 | 1.901 | 54 |
| Inventive Example 36 | $CaTiO_3$ | 0.82 | 1.911 | 46 |
| Inventive Example 37 | $MgAl_2O_4$ | 0.80 | 1.912 | 54 |
| Inventive Example 38 | $FeTiO_4$ | 0.79 | 1.915 | 54 |
| Inventive Example 39 | $SrZrO_3$ | 0.76 | 1.914 | 52 |
| Inventive Example 40 | $Y_2O_3$ | 0.63 | 1.951 | 42 |
| Inventive Example 41 | $ZrSiO_4$ | 0.62 | 1.948 | 42 |
| Comparative Example 1 | Forsterite film (non-coating) | 0.94 | 1.908 | 70 |
| Comparative Example 2 | Colloidal silica/Al $(H_2PO_4)_3$ Coating 1:1 | 0.88 | 1.907 | 68 |

As listed in Table 1, it can be confirmed that the magnetic characteristics of Inventive Examples 1 to 41 are much better than those of Comparative Examples 1 and 2. It can be confirmed that the effect is obtained by maximizing the film tension by patterning the ceramic layer.

EXAMPLE 2

Characteristics According to Oriented Electrical Steel Sheet Composition

Inventive Examples 42 to 47

Inventive Examples42 to 47 were performed similarly to Inventive Example 3, but Inventive Examples 42 to 47 were performed by changing 0.04% by weight of antimony (Sb) and the content of tin (Sn) in the composition of the oriented electrical steel sheet as listed in Table 2 below and magnetic characteristics and noise were measured by the method of Experimental Example 1 described above and summarized in Table 2 below.

TABLE 2

| Classification | Sn (wt %) | Sb (wt %) | Grain size (mm) | Magnetic characteristic $W_{17/50}$ (W/kg) | $B_8$ (T) | Noise (dBa) |
|---|---|---|---|---|---|---|
| Inventive Example 42 | — | — | 70 | 1.01 | 1.88 | 62 |
| Inventive Example 43 | 0.008 | — | 69 | 1.03 | 1.88 | 61 |
| Inventive Example 44 | 0.08 | 0.08 | 20 | 0.99 | 1.86 | 72 |
| Inventive Example 45 | — | 0.01 | 50 | 0.81 | 1.92 | 52 |
| Inventive Example 46 | 0.05 | 0.03 | 36 | 0.63 | 1.93 | 41 |
| Inventive Example 47 | 0.07 | 0.08 | 30 | 0.75 | 1.91 | 49 |

As listed in Table 2, it can be confirmed that the magnetic properties and the noise characteristics of Inventive Examples 45 to 47 are very excellent, It can be confirmed that this is an effect exhibited by the average size of the average grain after the final annealing is finer in the range of 10 to 60 mm and patterning a ceramic layer of high tensile strength through a series of processes of hot rolling, cold rolling, decarburization annealing, and final annealing of the slab including Sn and Sb.

EXAMPLE 3

Characteristics According to Equation 1

Inventive Examples K1 to K9

A slab was prepared, which includes silicon (Si) of 3.6 wt %, aluminum (Al) of 0.03 wt %, manganese (Mn) of 0.07 wt %, antimony (Sb) of 0.05 wt %, and tin (Sn) of 0.05 wt % and has a remaining amount consisting of Fe and other unavoidable impurities.

The slab was heated at 1150° C. for 220 minutes and hot-rolled to a thickness of 2.3 mm to prepare a hot-rolled sheet. The hot-rolled sheet was heated to 1120° C., held at 920° C. for 95 seconds, quenched in water and pickled, and then cold-rolled to a thickness of 0.23 mm to prepare a cold-rolled sheet.

The cold-rolled sheet was placed in a furnace maintained at 850° C., and then the dew point temperature and the oxidizing ability were controlled, and decarburization nitriding and primary recrystallization annealing were performed simultaneously in hydrogen, nitrogen, and ammonia mixed gas atmosphere to prepare decarburized and annealed steel sheet.

Thereafter, slurry was prepared by mixing distilled water with an annealing separator including MgO as a main component, the slurry was applied to the decarburized annealed steel sheet using a roll or the like, and finally annealed.

During the final annealing, the primary cracking temperature was 700° C., the secondary cracking temperature was 1200° C., and the temperature period was 15° C./hr in the temperature rising period. In addition, the mixed gas atmosphere of 25% by volume of nitrogen and 75% by volume of hydrogen was made up to 1200° C., and after reaching 1200° C., it was maintained in a hydrogen gas atmosphere of 100% by volume for 15 hours and then furnace-cooled.

Thereafter, hydrogen ($H_2$) gas and oxygen ($O_2$) gas are injected into the flame spray coating apparatus and ignited to form flames at high temperature and high pressure, ceramic powder is supplied to the flame to form a ceramic layer with a 20 mm coating width (w) and a 20 mm coating distance (d) on the surface of the final annealing sheet in a width direction. The characteristics of the ceramic layer are summarized in Table 3 below, and the insulating properties, the drop rate, and the adhesion were evaluated in accordance with Experimental Example 2 below, and the results are listed in Table 3 below.

Experimental Example 2

Evaluation of Insulation Property, Drop Rate and Adhesion

The insulating property was measured on the coating using a Franklin meter according to ASTM A717 international standard.

The drop rate was measured using a measuring instrument according to JIS 02550 international standard. A plurality of electrical steel sheet specimens is stacked and thereafter, a uniform pressure of 1 MPa was applied to the surface of the plurality of electric steel sheet specimens, and then, the drop rate was measured by dividing an actual weight ratio of the steel sheet to the electrical steel sheet by a theoretical weight through precise measurement of heights of four planes of the specimen.

The adhesion is represented by a minimum arc diameter without film peeling when the specimen is bent by 180° in contact with a 10 to 100 mm arc.

TABLE 3

| Classification | Characteristics of ceramic layer | | | | Insulation (mA) | Drop rate (%) | Adhesion (mmΦ) |
|---|---|---|---|---|---|---|---|
| | Powder type | Film tension (A, MPa) | Thickness (B, μm) | A/B | | | |
| Inventive Example K1 | $MgO•SiO_2$ | 4 | 4 | 1 | 144 | 96.0 | 25 |
| Inventive Example K2 | $SiO_2$ | 20 | 0.1 | 200 | 910 | 99.1 | 20 |
| Inventive Example K3 | $Al_3O_3•TiO_2$ | 7 | 2.5 | 2.80 | 85 | 97.6 | 15 |
| Inventive Example K4 | $TiO_2$ | 14 | 0.8 | 17.5 | 350 | 98.7 | 15 |
| Inventive Example K5 | $ZrSiO_4$ | 10 | 1.2 | 8.33 | 157 | 98.5 | 20 |
| Inventive Example K6 | $FeAl_2O_4$ | 1 | 0.05 | 20 | 980 | 98.3 | 20 |
| Inventive Example K7 | TiC | 3 | 5 | 0.6 | 140 | 95.7 | 40 |
| Inventive Example K8 | CrN | 25 | 6 | 4.17 | 13 | 95.2 | Surface peeling |
| Inventive Example K9 | $CaTiO_3$ | 20 | 5 | 4.0 | 55 | 95.5 | Surface peeling |

As listed in Table 3, it can be confirmed that the results of Inventive Examples K1 to K5 are excellent in insulating property, drop rate, and adhesion. It can be confirmed that this is an effect achieved by controlling the film tension A and the coating thickness B of the ceramic powder to 1.00≤A/B≤200 (0.1≤B≤4).

Furthermore, considering that the adhesion in Inventive Examples K3 and K4 is particularly excellent, it can be confirmed that by controlling the film tension A and the coating thickness B of the ceramic layer to 2.80≤A/B≤17.50 (0.8≤B≤2.5), thereby obtaining a more excellent effect.

EXAMPLE 4

Characteristics According to Equation 2

Inventive Examples J1 to J9

A slab was prepared, which includes silicon (Si) of 3.8 wt %, aluminum (Al) of 0.03 wt %, manganese (Mn) of 0.09 wt %, antimony (Sb) of 0.04 wt %, and tin (Sn) of 0.03 wt % and has a remaining amount consisting of Fe and other unavoidable impurities.

The slab was heated at 1150° C. for 220 minutes and hot-roiled to a thickness of 2.3 mm to prepare a hot-rolled sheet.

The hot-rolled sheet was heated to 1120° C., held at 920° C. for 95 seconds, quenched in water and pickled, and then cold-rolled to a thickness of 0.23 mm to prepare a cold-rolled sheet.

The cold-rolled sheet was placed in a furnace maintained at 850° C., and then the dew point temperature and the oxidizing ability were controlled, and decarburization nitriding and primary recrystallization annealing were performed simultaneously in hydrogen, nitrogen, and ammonia mixed gas atmosphere to prepare decarburized and annealed steel sheet.

Thereafter, slurry was prepared by mixing distilled water with an annealing separator including MgO as a main component, the slurry was applied to the decarburized annealed steel sheet using a roll or the like, and finally annealed.

During the final annealing, the primary cracking temperature was 700° C., the secondary cracking temperature was 1200° C., and the temperature period was 15° C./hr in the temperature rising period. In addition, the mixed gas atmosphere of 25% by volume of nitrogen and 75% by volume of hydrogen was made up to 1200° C., and after reaching 1200° C., it was maintained in a hydrogen gas atmosphere of 100% by volume for 15 hours and then furnace-cooled.

After that, $ZrSiO_4$ ceramic powder was supplied to a heat source in which helium (He) gas was made into plasma with a power of 150 kW to adjust the coating width and the coating interval (d) on the final annealed sheet surface, thereby forming the ceramic layer by changing the coating area. The surface quality and the noise characteristics were evaluated under the conditions of the following Experimental Example 3, and the results are listed in Table 4.

Experimental Example 3

Evaluation of Surface Quality

Surface quality is to evaluate occurrence of rust while a specimen is left in a NaCl solution at 5% and 35° C. for 8 hours, and if the rust occurrence area was 5% or less, the surface quality was excellent (◎), if 20% or less, the surface quality was good (○), and if 20 to 50%, the surface quality was slightly poor (Δ), and if 50% or more, the surface quality was poor (X).

TABLE 4

| Classification | Characteristics of ceramic layer: Area ratio of ceramic layer (C, %) | Film tension (A)/thickness (B) | (A/B)/C | Surface Quality | Noise (dBA) |
|---|---|---|---|---|---|
| Inventive Example J1 | 20 | 200 | 10 | ○ | 58 |
| Inventive Example J2 | 40 | 17.5 | 0.438 | ◎ | 55 |
| Inventive Example J3 | 60 | 5.0 | 0.083 | ◎ | 56 |
| Inventive Example J4 | 80 | 2.8 | 0.035 | ○ | 57 |
| Inventive Example J5 | 100 | 1.00 | 0.01 | ○ | 59 |
| Inventive Example J6 | 0.5 | 0.6 | 1.2 | Δ | 65 |
| Inventive Example J7 | 5 | 5.0 | 1.0 | Δ | 65 |

TABLE 4-continued

| Classification | Characteristics of ceramic layer: Area ratio of ceramic layer (C, %) | Film tension (A)/thickness (B) | (A/B)/C | Surface Quality | Noise (dBA) |
|---|---|---|---|---|---|
| Inventive Example J8 | 10 | 20 | 2.0 | Δ | 64 |
| Inventive Example J9 | 10 | 50 | 5.0 | X | 67 |

As listed in Table 4, as the results of Inventive Examples J1 to J5, it can be seen that surface quality and noise characteristics are excellent. It can be seen that this is an effect achieved by controlling the coating area C of the ceramic layer, the film tension A, and the coating thickness B to $0.01 \leq (A/B)/C \leq 10$ ($20 \leq C \leq 100$).

Furthermore, considering that the noise characteristic is particularly excellent in Inventive Examples J2 to J4, it can be seen that it is possible to obtain an more excellent effect by controlling the coating area C of the ceramic layer, the film tension A, and the coating thickness B to $0.035 \leq (A/B)/C \leq 0.438$ ($40 \leq C \leq 80$).

EXAMPLE 5

Evaluation of Magnetic Characteristic and Boise Characteristic of 1500 kVA Transformer As the oriented electrical steel sheet, Inventive Example K4 and Comparative Example 1 were respectively selected. Magnesium phosphate was treated on the surface so that an applying amount thereof was 1.7 g/m$^2$ and treated for 90 seconds in a drying furnace set at 870° C., laser magnetic domain refining treatment was performed, and a 1500 kVA transformer was manufactured. The results evaluated under the condition of 60 Hz according to a design magnetic flux density were listed in Table 5.

TABLE 5

| Oriented electrical steel sheet | Magnetic characteristic | | Noise (60 Hz, dBA) | | | | | |
|---|---|---|---|---|---|---|---|---|
| | $W_{17/50}$ (W/kg) | $B_8$ (T) | 1.3 T | 1.4 T | 1.5 T | 1.6 T | 1.7 T | 1.8 T |
| Inventive Example K4 | 0.65 | 1.93 | 42.71 | 44.11 | 46.75 | 48.67 | 48.19 | 53.49 |
| Comparative Example 1 | 0.80 | 1.91 | 56.09 | 59.76 | 62.94 | 64.25 | 68.71 | 70.80 |

As listed in Table 5, it can be seen that both the magnetic characteristic and the noise characteristic are excellent when the transformer is manufactured from the oriented electrical steel sheet according to the exemplary embodiment of the present invention.

EXAMPLE 6

Evaluation of Magnetic Characteristics, Drop Rate and Noise Characteristics of 1000 kVA Transformer As the oriented electrical steel sheet, Inventive Examples J2 and K5 and Comparative Example 1 were respectively selected. Aluminum phosphate was treated on the surface so that an applying amount thereof was 1.5 g/m$^2$ and treated for 120 seconds in a drying furnace set at 850'C., laser magnetic domain refining treatment was performed, and a 1000 kVA transformer was manufactured. The results evaluated under the condition of 60 Hz according to a design magnetic flux density were listed in Table 6.

TABLE 6

| Oriented electrical steel sheet | Magnetic characteristic | | Drop rate | Noise |
|---|---|---|---|---|
| | $W_{17/50}$ (W/kg) | $B_8$ (T) | (%) | (dBA) |
| Inventive Example J2 | 0.61 | 1.92 | 97.7 | 41.5 |
| Inventive Example K5 | 0.63 | 1.91 | 97.6 | 42.7 |
| Comparative Example 1 | 0.77 | 1.91 | 97.0 | 55.2 |

EXAMPLE 7

Evaluation of Characteristics After SRA

A slab including 3.2 wt % of silicon (Si), 0.03 wt % of aluminum (Al), 0.10 wt % of manganese (Mn), 0.05 wt % of antimony (Sb), 0.05 wt % of tin (Sn), and a remaining amount consisting of Fe and other unavoidable impurities was prepared.

The slab was heated at 1150° C. for 220 minutes and hot-rolled to a thickness of 2.3 mm to prepare a hot-rolled sheet.

The hot-rolled sheet was heated up to 1120° C., kept at 920° C. for 95 seconds, cooled and pickled in water, and then cold-rolled with a thickness of 0.23 mm to manufacture a cold-rolled sheet.

The cold-rolled sheet was introduced into a furnace which is kept at 850° C. and then a dew point temperature and oxidizing ability were controlled, and then decarburizing nitriding and primary recrystallization annealing are simultaneously performed in a mixed gas atmosphere of hydrogen, nitrogen, and ammonia to manufacture a decarburized and annealed steel sheet.

Thereafter, slurry was prepared by mixing distilled water with an annealing separator including MgO as a main component and the slurry was applied to a decarburized annealed steel sheet using a roll or the like, and then final annealing was performed.

At the time of final annealing, a primary cracking temperature was 700° C. and a secondary cracking temperature was 1200° C., and a temperature period of a temperature rising period was 15° C./hr. Further, up to 1200° C., a mixed gas atmosphere of 25 vol % of nitrogen and 75 vol % of hydrogen was set and after reaching 1200° C., a hydrogen gas atmosphere of 100 vol % was kept for 15 hours, and then furnace cooling was performed.

Thereafter, $Al_2O_3$ powder was supplied to a heat source obtained by mixing argon (Ar) gas and nitrogen gas ($N_2$) at a volume ratio of 1:1 and plasmalizing the mixed gas at an output of 100 kW to form a ceramic layer having a thickness of 0.8 μm was formed on the surface of the final annealing sheet with a coating width w of 30 mm and a coating interval d of 20 mm in a width direction of the steel sheet. Thereafter, the steel sheet was applied with a solution obtained by mixing, at a ratio of 4:6, colloidal silica and phosphate mixed with aluminum and magnesium at a weight ratio of 1:1 and heat-treated for 45 seconds under a temperature condition of 920° C.

Stress relief annealing (SRA) was heat-treated at 845° C. for 2 hours in a dry mixed gas atmosphere of hydrogen and nitrogen. The adhesion was measured by the method of Experimental Example 2 after SRA, and the corrosion resistance was measured according to a rust occurrence while a specimen is left in a NaCl solution at 5% and 35° C. for 8 hours. As a result, if the rust occurrence area was 5% or less, the result is excellent, if 20% or less, the result is good, if 20 to 50%, the quality is slightly poor, and if 50% or more, the quality is poor.

TABLE 7

| Magnetic characteristic | | | | Adhesion after | |
|---|---|---|---|---|---|
| $W_{17/50}$ (W/kg) | $B_8$ (T) | Drop rate (%) | Noise (dBA) | SRA (mmΦ) | Corrosion resistance |
| 0.64 | 1.92 | 98.5 | 44.1 | 20 | Excellent |

The present invention is not limited to the exemplary embodiments and may be prepared in various forms, and it will be understood by a person with ordinary skill in the art, to which the present invention pertains, that embodiments of the present invention may be implemented in other specific forms without modifying the technical spirit or essential feature of the present invention. Thus, it is to be appreciated that the embodiments described above are intended to be illustrative in every aspects, and not restrictive.

| <Description of symbols> | |
|---|---|
| 100: Oriented electrical steel sheet | |
| 10: Oriented electrical steel sheet substrate | |
| 20: Forsterite film | 30: Ceramic layer |
| 40: Insulating film layer | |

The invention claimed is:

1. An oriented electrical steel sheet comprising:

a forsterite film formed on one side or both sides of an oriented electrical steel sheet substrate; and a ceramic layer formed on an entire or partial region of the forsterite film, and a portion where the ceramic layer is formed and a portion where the ceramic layer is not formed alternately repeating in a width direction of the oriented electrical steel sheet to form a pattern, wherein an area ratio C of the portion where the ceramic layer is formed with respect to the entire surface of the oriented electrical steel sheet is 15 to 80%.

2. The oriented electrical steel sheet of claim 1, wherein: a width of the portion where the ceramic layer is formed is 2 mm or more.

3. The oriented electrical steel sheet of claim 1, wherein: a thickness of the ceramic layer is 0.1 to 4 μm.

4. The oriented electrical steel sheet of claim 3, wherein: the ceramic layer satisfies the following Equation 1.

$$1.00 \leq A/B \leq 200 \quad \text{[Equation 1]}$$

wherein A represents a film tension (MPa) of the ceramic layer and B represents a thickness (μm) of the ceramic layer.

5. The oriented electrical steel sheet of claim 1, wherein: the ceramic layer satisfies the following Equation 2.

$$0.01 \leq (A/B)/C \leq 10 \quad \text{[Equation 2]}$$

wherein A represents a film tension (MPa) of the ceramic layer, B represents a thickness (μm) of the ceramic layer, and C represents an area ratio (%) of the portion where the ceramic layer is formed with respect to the entire surface of the oriented electrical steel sheet.

6. The oriented electrical steel sheet of claim 1, wherein: the ceramic layer is made of ceramic powder.

7. The oriented electrical steel sheet of claim 6, wherein: the ceramic powder is oxide, nitride, carbide, or oxynitride including at least one kind of component selected from Li, B, Ca, Sr, Mg, Al, Si, P, Ti, V, Mn, Fe, Co, Ni, Cu, Zn, Zr, Sn and Ba.

8. The oriented electrical steel sheet of claim 6, wherein: the ceramic powder includes at least one kind selected from $Al_2O_3$, $SiO_2$, $TiO_2$, $ZrO_2$, $MgO.Al_2O_3$, $2MgO.SiO_2$, $MgO.SiO_2$, $2MgO.TiO_2$, $MgO.TiO_2$, $MgO.2TiO_2$, $Al_2O_3.SiO_2$, $3Al_2O_3.2SiO_2$, $Al_2O_3.SiO_2$, $ZnO^2.SiO_2$, $ZrO_2.SiO_2$, $ZrO_2.TiO_2$, $9Al_2O_3.2B_2O_3$, $2Al_2O_3.B_2O_3$, $2MgO.2Al_2O_3.5SiO_2$, $Li_2O.Al_2O_3.SiO_2$, $Li_2O.Al_2O_3.4SiO_2$, $BaO.Al_2O_3.SiO_2$, AlN, SiC, TiC, TiN, BN, ZrN, CrN, $BaTiO_3$, $SrTiO_3$, $FeTiO_3$, $MgTiO_3$, CaO, $FeAl_2O_4$, $CaTiO_3$, $MgAl_2O_4$, $FeTiO_4$, $SrZrO_3$, $Y_2O_3$ and $ZrSiO_4$.

9. The oriented electrical steel sheet of claim 6, wherein: a particle size of the ceramic powder is 10 to 1000 nm.

10. The oriented electrical steel sheet of claim 1, further comprising: an insulating film layer including metal phosphate formed on the ceramic layer.

11. The oriented electrical steel sheet of claim 10, wherein:

the metal phosphate includes at least one kind selected from Mg, Ca, Ba, Sr, Zn, Al and Mn.

12. The oriented electrical steel sheet of claim 1, wherein: the oriented electrical steel sheet substrate includes 2.6 to 5.5 wt % of silicon (Si), 0.020 to 0.040 wt % of aluminum (Al), 0.01 to 0.20 wt % of manganese (Mn), and 0.01 to 0.15 wt % of antimony (Sb), tin (Sn), or combinations thereof, and a remaining amount consisting of Fe and other unavoidable impurities.

13. The oriented electrical steel sheet of claim 1, wherein: a grain size in the oriented electrical steel sheet substrate is 10 to 60 mm.

* * * * *